(12) United States Patent
Kobayashi et al.

(10) Patent No.: US 9,590,462 B2
(45) Date of Patent: Mar. 7, 2017

(54) ELECTRIC COMPRESSOR

(71) Applicant: Panasonic Intellectual Property Management Co., Ltd., Osaka (JP)

(72) Inventors: Gento Kobayashi, Shiga (JP); Nobuyuki Nishii, Shiga (JP); Nobuaki Ogawa, Shiga (JP); Minoru Fukumoto, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 203 days.

(21) Appl. No.: 14/430,331

(22) PCT Filed: Oct. 24, 2013

(86) PCT No.: PCT/JP2013/006288
§ 371 (c)(1),
(2) Date: Mar. 23, 2015

(87) PCT Pub. No.: WO2014/068914
PCT Pub. Date: May 8, 2014

(65) Prior Publication Data
US 2015/0214805 A1 Jul. 30, 2015

(30) Foreign Application Priority Data

Oct. 30, 2012 (JP) .................................. 2012-238652
Dec. 21, 2012 (JP) .................................. 2012-279004

(51) Int. Cl.
*H02K 11/00* (2016.01)
*H02K 3/38* (2006.01)
(Continued)

(52) U.S. Cl.
CPC ............... *H02K 3/38* (2013.01); *F01C 21/10* (2013.01); *F04B 35/04* (2013.01); *F04B 39/121* (2013.01);
(Continued)

(58) Field of Classification Search
CPC ............. H02K 3/38; H02K 3/50; H02K 3/522
(Continued)

(56) References Cited

U.S. PATENT DOCUMENTS 8,841,806 B2 * 9/2014 Fukasaku .................. H02K 3/28
310/207
2011/0243769 A1 10/2011 Yamada et al.
(Continued)

FOREIGN PATENT DOCUMENTS

CN 1204744 1/1999
CN 2750075 1/2006
(Continued)

OTHER PUBLICATIONS

Search Report from corresponding Chinese patent application, dated Jan. 8, 2016, and English language translation thereof, 4 pages total.
(Continued)

*Primary Examiner* — Hanh Nguyen
(74) *Attorney, Agent, or Firm* — Hamre, Schumann, Mueller & Larson, P.C.

(57) ABSTRACT

An electric compressor includes a hermetic container 103, an electric motor drive circuit section 201, a through hole 120, a hermetic terminal 207, a conductive terminal 301, a connecting terminal 302, and a housing 300. The terminal connecting portion connects the conductive terminal 301 and the cluster terminal 302 to each other. The housing is composed of a plurality of structure bodies. A convexoconcave shape is provided between bonding surfaces of the
(Continued)

plurality of structure bodies. The housing 300 is provided with a cylindrical structure 311 into which the conductive terminal 301 is inserted. A convex structure 316 which comes into contact with the wire 306 is formed on an inner surface of the wire-insertion hole 307.

5 Claims, 7 Drawing Sheets

(51) Int. Cl.
　　　*F04B 35/04*　　(2006.01)
　　　*F04B 39/12*　　(2006.01)
　　　*F01C 21/10*　　(2006.01)
　　　*F04C 23/00*　　(2006.01)
　　　*H02K 5/10*　　(2006.01)
　　　*H02K 5/22*　　(2006.01)
　　　*H02K 7/14*　　(2006.01)
　　　*H02K 5/08*　　(2006.01)
　　　*F04C 18/02*　　(2006.01)

(52) U.S. Cl.
　　　CPC ............. *F04C 23/008* (2013.01); *H02K 5/08* (2013.01); *H02K 5/10* (2013.01); *H02K 5/225* (2013.01); *H02K 7/14* (2013.01); *H02K 11/33* (2016.01); *F04C 18/0215* (2013.01); *F04C 2240/803* (2013.01); *F04C 2240/808* (2013.01); *H02K 2205/09* (2013.01)

(58) Field of Classification Search
　　　USPC ........................................................ 310/71
　　　See application file for complete search history.

(56) References Cited

U.S. PATENT DOCUMENTS

| | | | |
|---|---|---|---|
| 2012/0230849 A1* | 9/2012 | Yamada | F04B 35/04 |
| | | | 417/410.1 |
| 2012/0230851 A1 | 9/2012 | Fukasaku et al. | |
| 2012/0237372 A1* | 9/2012 | Fukasaku | H02K 3/50 |
| | | | 417/410.1 |
| 2013/0064697 A1* | 3/2013 | Fukasaku | H02K 3/38 |
| | | | 417/410.1 |
| 2013/0142682 A1* | 6/2013 | Watanabe | F04B 39/121 |
| | | | 417/423.7 |

FOREIGN PATENT DOCUMENTS

| | | |
|---|---|---|
| JP | 63-201636 | 8/1988 |
| JP | 05-321840 | 12/1993 |
| JP | 10-284852 | 10/1998 |
| JP | 3853779 | 12/2006 |
| JP | 2009-97503 | 5/2009 |
| JP | 2010-65625 | 3/2010 |
| JP | 2011-211876 | 10/2011 |
| JP | 2012-184752 | 9/2012 |

OTHER PUBLICATIONS

Office Action from corresponding Chinese patent application, dated Jan. 25, 2016, and English language translation thereof, 7 pages total.

\* cited by examiner

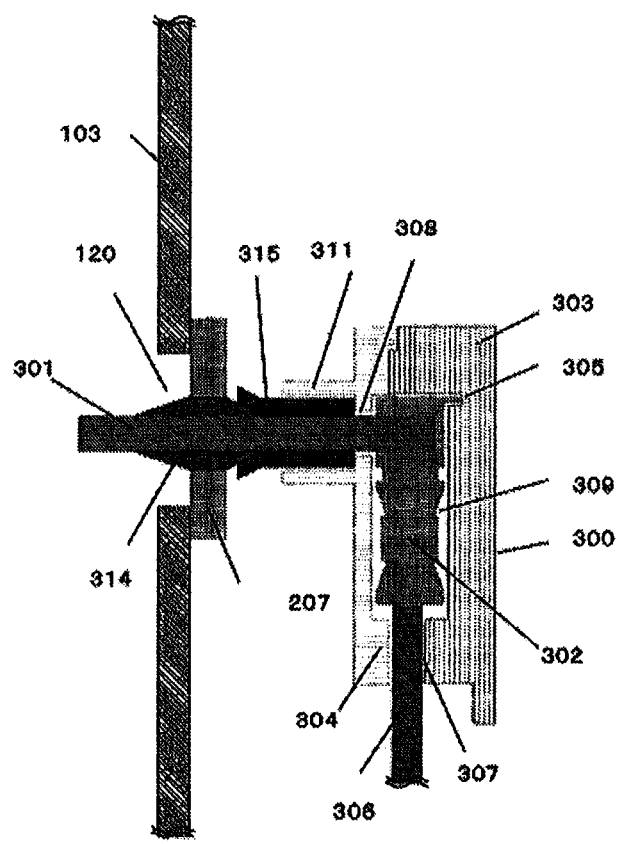

ELECTRIC COMPRESSOR

TECHNICAL FIELD

The present invention relates to an electric compressor, and more particularly, to a cluster block.

BACKGROUND TECHNIQUE

In recent years, there is proposed an electric compressor in which an inverter section for driving and controlling a motor section is integrally fixed to a compression mechanism and a motor section.

Further, there is proposed an electric compressor in which pressure in a housing and pressure in a hermetic container are equalized, and insulation resistance of the hermetic container with respect to a conductive member, a conductive portion of a wire and a terminal-connecting portion can be enhanced (see patent document 1 for example). This electric compressor is provided with a seal member for sealing between a wire and an insertion hole from which the wire is pulled out.

PRIOR ART DOCUMENT

Patent Document

[Patent Document 1] Japanese Patent Application Laid-open No. 2010-65625

SUMMARY OF THE INVENTION

Problem to be Solved by the Invention

According to the conventional configuration, since the seal member for completely insulating between inside and outside of a cluster is added, costs are increased, and since the number of parts is increased and the number of operation steps is increased.

The present invention solves the conventional problem, and it is possible to increase an insulation resistance value between inside and outside of a housing and an insulation resistance value between a conductive terminal and a hermetic terminal with a simple and inexpensive configuration.

Means for Solving the Problem

To solve the conventional problems, the present invention provides an electric compressor including: a hermetic container provided therein with a compression mechanism and a motor section; an electric motor drive circuit section which is placed outside the hermetic container and which drives and controls the motor section; a through hole formed in the hermetic container; a hermetic terminal placed in the through hole; a conductive terminal which is fixed to the hermetic terminal through an insulating member and which electrically connects the motor section and the electric motor drive circuit section to each other; a connecting terminal mounted on a wire of the motor section; and a housing including a conductive terminal-insertion hole through which the conductive terminal penetrates and including a wire-insertion hole through which the wire penetrates, the housing which connects the conductive terminal and the connecting terminal to each other, wherein the housing is composed of a plurality of structure bodies, a convexo-concave shape which does not have a function to completely seal inside and outside of the housing is provided between bonding surfaces of the plurality of structure bodies, the housing is provided with a cylindrical structure into which the conductive terminal is inserted toward the hermetic terminal, and a convex structure which comes into contact with the wire is formed on an inner surface of the wire-insertion hole.

Effect of the Invention

According to the electric compressor of the present invention, it is possible to increase an insulation resistance value between inside and outside of the housing and an insulation resistance value between the conductive terminal and the hermetic terminal. Since the convexo-concave shape and the cylindrical structure do no completely hermetically close the inside and the outside of the housing, it is unnecessary to provide the housing with a pressure equalizing structure. By forming the convex structure between the wire and the wire-insertion hole, the wire is fixed without using a seal member. According to this, the housing is composed of two structure bodies, it is possible to enhance insulation properties, to minimize the increase in the number of parts, and to reduce cost.

BRIEF DESCRIPTION OF THE DRAWINGS

FIG. 7 is a diagram showing an essential portion of a cluster block in a fifth embodiment of the invention.

Figure 1:
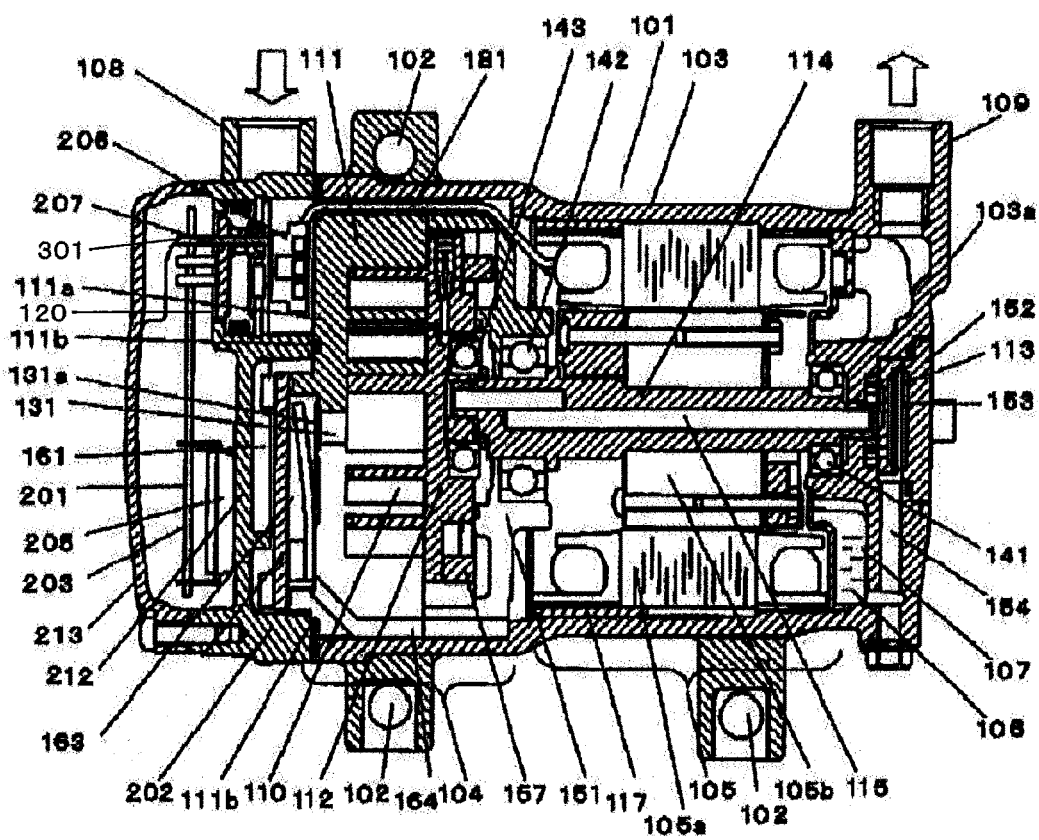
FIG. 1 is a sectional view of an electric compressor according to a first embodiment of the present invention.

EXPLANATION OF SYMBOLS 201 electric motor drive circuit section
202 sub-casing
203 circuit substrate
205 heating element
206 cluster block
207 hermetic terminal
212 partitioning section
213 cover
300 housing
301 conductive terminal
302 cluster terminal
303 cluster case
304 cluster cover
305 terminal positioning section
306 wire
307 wire-insertion hole
308 conductive terminal-insertion hole
309 terminal accommodating section
310 partition wall
311 cylindrical structure
314 insulating member
315 insulating member
316, 317, 318, 319 convex structure

MODE FOR CARRYING OUT THE INVENTION

A first aspect of the present invention provides an electric compressor including: a hermetic container provided therein with a compression mechanism and a motor section; an electric motor drive circuit section which is placed outside the hermetic container and which drives and controls the motor section; a through hole formed in the hermetic container; a hermetic terminal placed in the through hole; a conductive terminal which is fixed to the hermetic terminal through an insulating member and which electrically connects the motor section and the electric motor drive circuit section to each other; a connecting terminal mounted on a wire of the motor section; and a housing including a conductive terminal-insertion hole through which the conductive terminal penetrates and including a wire-insertion hole through which the wire penetrates, the housing which connects the conductive terminal and the connecting terminal to each other, wherein the housing is composed of a plurality of structure bodies, a convexo-concave shape which does not have a function to completely seal inside and outside of the housing is provided between bonding surfaces of the plurality of structure bodies, the housing is provided with a cylindrical structure into which the conductive terminal is inserted toward the hermetic terminal, and a convex structure which comes into contact with the wire is formed on an inner surface of the wire-insertion hole. According to the first aspect of the invention, it is possible to reduce an opening area without completely hermetically close the inside and the outside of the housing, and to increase an insulation resistance value. The wire can be fixed even if a seal member is not used.

According to a second aspect of the invention, an interior space of the wire-insertion hole is of a quadrangular prism shape. According to the second aspect, it is possible to reduce the opening area without completely sealing the wire-insertion hole, and to increase the insulation resistance value. The wire can be fixed even if a seal member is not used. Further, since a shape is simple, it is easy to produce the electric compressor.

According to a third aspect of the invention, the inner surface of the wire-insertion hole is formed into a female thread shape, and the convex structure is formed on the inner surface of the wire-insertion hole. According to the third aspect, it is possible to reduce the opening area without completely sealing the opening, and to increase the insulation resistance value. The wire can be fixed even if a seal member is not used. Further, members other than the wire-insertion hole are hermetically closed, and even when an outer diameter of the wire and an inner diameter of the wire-insertion hole are equal to each other, the inside and the outside of the cluster can be brought into communication with each other.

According to a fourth aspect of the invention, the electric compressor further includes at least one more convex structure, and the plurality of convex structures are alternately provided. According to the fourth aspect, it is possible to reduce the opening area without completely sealing the wire-insertion hole, and to increase the insulation resistance value. The wire can be fixed even if a seal member is not used, stress in a pulling direction applied to the wire can be dispersed and received by the convex structure.

According to a fifth aspect of the invention, the insulating member is mounted on the conductive terminal in the cylindrical structure. According to the fifth aspect, it is possible to reduce the opening area, and to increase the insulation resistance value.

Embodiments of the present invention will be described with reference to the drawings. The invention is not limited to the embodiments.

(First Embodiment)

An electric compressor in a first embodiment will be described using FIGS. 1 to 3. FIG. 1 is a sectional view of the electric compressor in the first embodiment of the invention. The electric compressor 101 is a lateral type electric compressor which is laterally installed by mounting legs 102 existing around a body of the electric compressor 101.

The electric compressor 101 includes an electric motor 105 and a compression mechanism 104 provided in a metal hermetic container 103. The electric motor 105 drives the compression mechanism 104. The compression mechanism 104 is fitted into or press-fitted into the hermetic container 103. The hermetic container 103 forms a hermetic space together with a sub-casing 202. The sub-casing 202 is provided with a cover 213. An electric motor drive circuit section 201 is placed outside the sub-casing 202 and is covered with a cover 213.

The electric motor 105 is driven by the electric motor drive circuit section 201. The hermetic container 103 is provided with a liquid reservoir 106 therein. Liquid for lubricating various sliding portions including the compression mechanism 104 is stored in the liquid reservoir 106.

Refrigerant compressed by the electric compressor 101 is gas refrigerant. Liquid such as lubricant oil 107 is used as liquid for lubricating the sliding portions and for sealing the sliding portions of the compression mechanism 104. The lubricant oil 107 has compatibility with respect to refrigerant.

In the first embodiment, a scroll type compressor is described as the compression mechanism 104.

In FIG. 1, a pump 113, an auxiliary bearing 141, the electric motor 105 and a main bearing 142 are placed on the side of an end wall 103a in an axial direction in the hermetic container 103. The main bearing 142 is provided on a main bearing member 151. The pump 113 is held between a lid 152 and an outer surface of the end wall 103a of the hermetic container 103. A pump chamber 153 is formed inside of the lid 152. The pump chamber 153 is in communication with the liquid reservoir 106 through a pumping passage 154. The auxiliary bearing 141 is supported by the end wall 103a. The auxiliary bearing 141 pivotally supports one end of a drive shaft 114. The electric motor 105 is composed of a stator 105a and a rotor 105b. The stator 105a is shrink-fitted into and fixed to the hermetic container 103 or is fixed to the hermetic container 103 by an annular member 117. The rotor 105b is fixed to a drive shaft 114. The drive shaft 114 is rotated and driven by the rotor 105b. A fixed scroll 111 is fixed to the main bearing member 151 through a bolt (not shown). The main bearing 142 pivotally supports the other end of the drive shaft 114.

A swirling scroll 112 is sandwiched between the main bearing member 151 and the fixed scroll 111. A rotation-restraint section 157 is provided between the main bearing member 151 and the swirling scroll 112. The rotation-restraint section 157 is an Oldham ring which prevents the swirling scroll 112 from rotating and which allows circle motion of the swirling scroll 112. The other end of the drive shaft 114 is provided with an eccentric bearing 143. The swirling scroll 112 is made to swirl on a circular orbit by the eccentric bearing 143.

The sub-casing 202 is fitted into and fixed to an opening of the hermetic container 103. A suction pipe 108 is formed in the sub-casing 202. A suction passage 161 is formed in a space leading from the suction pipe 108 such that airtightness is secured between the sub-casing 202 and a fixed panel 111a of the fixed scroll 111 using a seal member 111b. A suction passage outlet hole (not shown) of the suction passage 161 corresponds to a suction hole in the fixed scroll 111.

A discharge hole 131 is formed in the fixed panel 111a of the fixed scroll 111. A reed valve 131a is provided in a discharge hole 131. The discharge hole 131 opens into a discharge chamber 163. The discharge chamber 163 is in communication with a space in the hermetic container 103 through a communication passage 164. The electric motor 105 is placed in the hermetic container 103. The communication passage 164 is formed between the fixed scroll 111 and the hermetic container 103, and between the main bearing member 151 and the hermetic container 103. The discharge chamber 163 projects into the suction passage 161, i.e., the discharge chamber 163 overlaps with the suction passage 161. Therefore, as compared with a case where the discharge chamber 163 and the suction passage 161 do not overlap with each other, a size of the hermetic container 103 in its axial direction can be reduced.

An electric motor drive circuit section (inverter section) 201 is mounted on a partitioning section 212 of the sub-casing 202. A circuit substrate 203 and an electrolytic capacitor (not shown) are provided on a surface of the electric motor drive circuit section (inverter section) 201 opposite from the suction passage 161. A heating element 205 of an IPM (intelligent power module) including a switching element having a high heat-generating degree is provided on the circuit substrate 203. The heating element 205 is in thermally intimate contact with the partitioning section 212. A through hole 120 is formed in the sub-casing 202 which configures the hermetic container 103. The hermetic terminal 207 is mounted on the through hole 120 to secure a hermetically closed state in the hermetic container 103. A conductive terminal 301 is fixed to the hermetic terminal 207. One end of the conductive terminal 301 is electrically connected to a cluster terminal 302 in a cluster block 206. The electric motor drive circuit section 201 and the electric motor 105 are electrically connected to each other through the conductive terminal 301 and the cluster terminal 302. The electric motor 105 is driven by the electric motor drive circuit section 201 while monitoring necessary information such as temperature.

According to the above-described configuration, the electric motor 105 is driven by the electric motor drive circuit section 201, and the electric motor 105 drives the compression mechanism 104 and the pump 113 through the drive shaft 114. At this time, lubricant oil 107 in the liquid reservoir 106 is supplied to the compression mechanism 104 by the pump 113 through an oil filling passage 115 of the drive shaft 114. The supplied lubricant oil 107 lubricates and seals the compression mechanism 104. Returning refrigerant gas from a refrigeration cycle is sucked into the compression mechanism 104 through the suction pipe 108, the suction passage 161 and a suction hole (not shown). The refrigerant gas compressed in a compressing space 110 is discharged into the discharge chamber 163 from the discharge hole 131. The refrigerant gas discharged into the discharge chamber 163 passes through a peripheral space of the electric motor 105 through the communication passage 164, and cools the electric motor 105 and the refrigerant gas is discharged from the discharge port 109.

Figure 2:
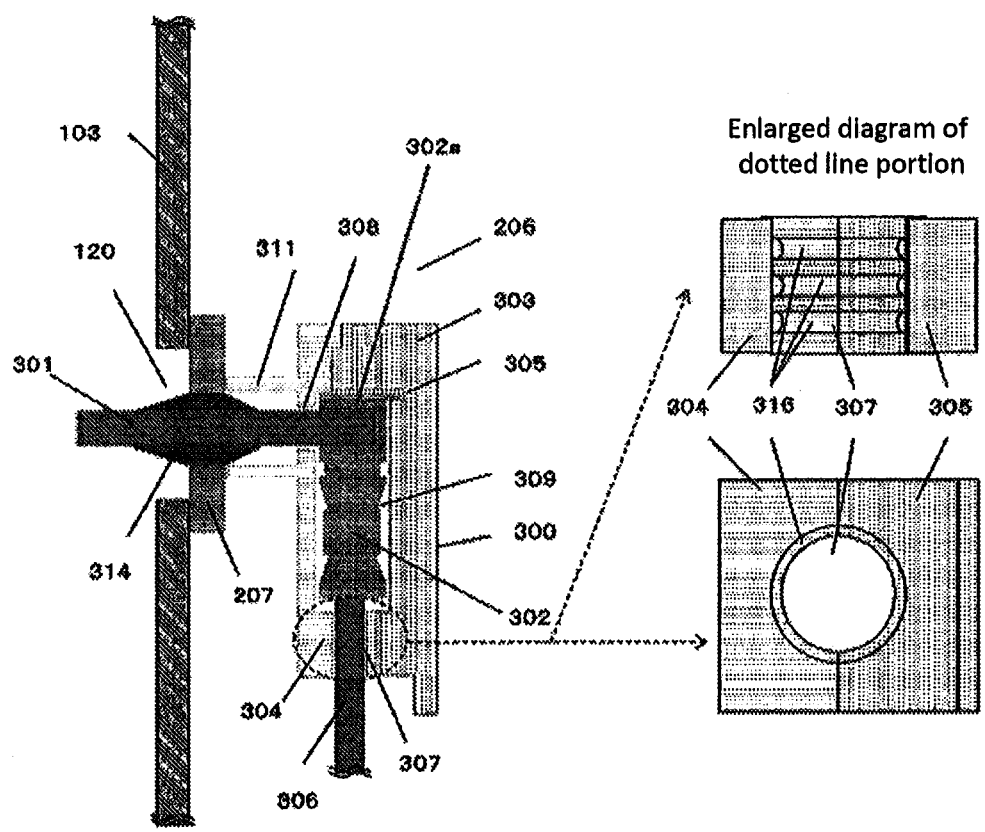
FIG. 2 is a diagram showing an essential portion of a cluster block in the first embodiment of the invention.

FIG. 2 is a partially enlarged sectional view of peripheries of the cluster block 206 and the hermetic terminal 207. FIG. 3 is a perspective view of the cluster block 206.

The hermetic terminal 207 is placed in the hermetic container 103. One end of the conductive terminal 301 fixed to the hermetic terminal 207 is placed in the hermetic container 103, and is connected to the cluster terminal (connecting terminal) 302 in the cluster block 206. The cluster block 206 is lateral to the hermetic terminal 207. In this embodiment, the cluster block 206 includes a housing 300. The housing 300 is made of material having insulation properties (synthetic resin material) and formed into a thin and long square box-shape.

As shown in FIG. 2, a wire 306 of the electric motor 105 is composed of a conducting body (not shown), and a resilient insulating tube (not shown) which electrically insulates the conducting body from outside. A connecting portion 302a to which the conductive terminal 301 is connected is formed on an end of the wire 306, and the cluster terminal 302 is mounted on the end of the wire 306. The housing 300 is composed of a cluster case 303 as a first housing structure body and a cluster cover 304 as a second housing structure body.

The cluster case 303 includes a terminal accommodating section 309 and a terminal positioning section 305. The cluster terminal 302 connected to the conductive terminal 301 is accommodated in the terminal accommodating section 309. The terminal positioning section 305 makes it possible to insert the conductive terminal 301 into the connecting portion 302a while setting a placing direction of the connecting portion 302a as an appropriate direction. The wire 306 is placed in a wire-insertion hole 307.

The wire-insertion hole 307 is a columnar hole formed by fitting the cluster case 303 and the cluster cover 304 to each other. An inner diameter of the wire-insertion hole 307 is equal to or greater than an outer diameter of the wire 306. An inner side of the wire-insertion hole 307 is provided with one or more convex structures 316 in a form of a ring. An opening size of the convex structure 316 at its vertex position is equal to or smaller than the outer diameter of the wire 306. The wire 306 comes into contact with the vertex of the convex structure 316 or is fastened by the vertex without undue force in the wire-insertion hole 307.

A length of the wire-insertion hole 307 in the axial direction can be increased by the convex structure 316, and a distance between the inside and the outside of the housing 300 in the wire-insertion hole 307, i.e., a distance of a portion thereof having a small opening area is increased. As compared with a case where the wire 306 is sandwiched by a flat surface, when the convex structure 316 is formed, the insulating tube does not easily bite at the time of assembling, and even when bending stress is applied to the wire 306, the entire wire-insertion hole 307 can receive the bending stress.

The cluster cover 304 is provided with a conductive terminal-insertion hole 308. The conductive terminal 301 is placed in the conductive terminal-insertion hole 308, and the conductive terminal 301 is fitted into the connecting portion 302a of the cluster terminal 302. The electric motor 105 and the conductive terminal 301 are electrically connected to each other through the cluster terminal 302. A cylindrical structure 311 is provided around the conductive terminal-insertion hole 308 of the cluster cover 304. An end of the conductive terminal 301 penetrates the cylindrical structure 311 and the conductive terminal-insertion hole 308 and, is placed in the housing 300. A tip end of the cylindrical structure 311 is brought close to the hermetic terminal 207. According to this, an opening area between the conductive terminal 301 the hermetic terminal 207, or an opening area between the conductive terminal 301 and the hermetic container 103 is reduced.

Figure 3:
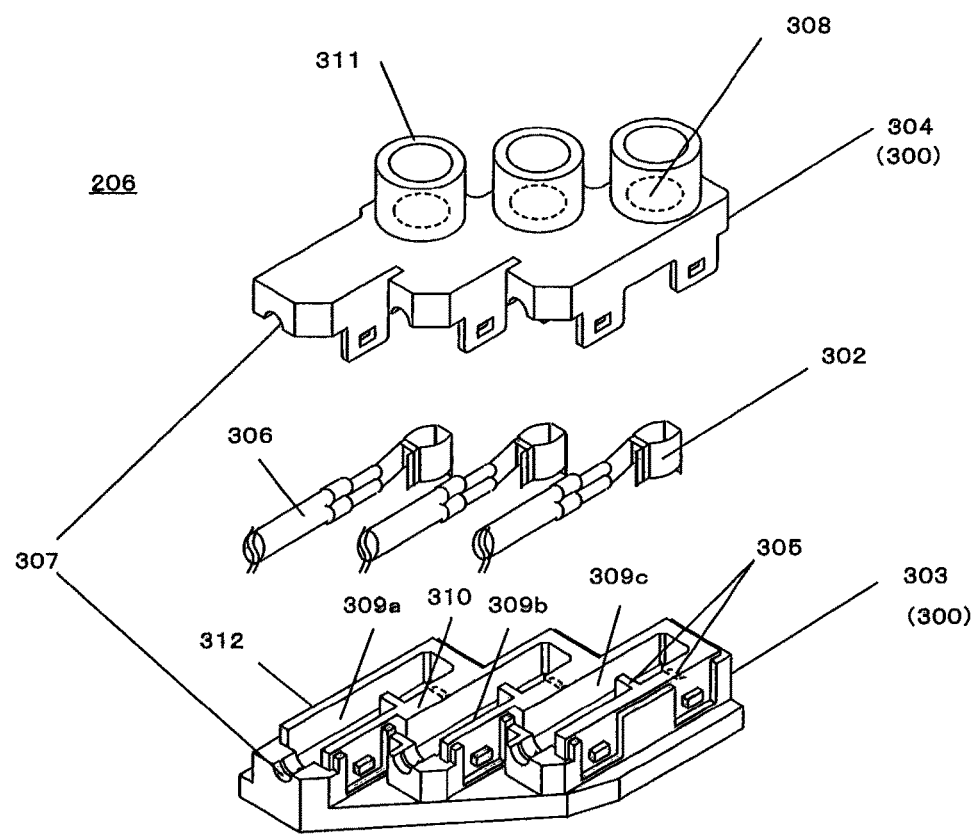
FIG. 3 is a perspective view of the cluster block in the first embodiment of the invention.

As shown in FIG. 3, the cluster case 303 and the cluster cover 304 are provided with three terminal accommodating sections 309a, 309b and 309c in which the cluster terminal 302 is accommodated. These terminal accommodating sections have the above-described configurations. A partition wall 310 partitions the terminal accommodating sections 309a, 309b and 309c from each other. A structure of the partition wall 310 is of a convexo-concave shape which alternately has narrow gaps without undue force.

The convexo-concave shape formed on the partition wall 310 of the cluster case 303 and the convexo-concave shape formed on the partition wall 310 of the cluster cover 304 are fitted to each other.

An insulation distance between the conductive terminals 301 is secured by the convexo-concave shapes. A structure of an outer periphery 312 of the housing 300 which becomes a contact between the inside and the outside of the housing 300 is also of a convexo-concave shape, and the outer periphery 312 is configured such that the opening area is made small and a length of a portion having the small opening area becomes long.

When the operation of the electric compressor 101 configured as described above is stopped, gas refrigerant remaining in the hermetic container 103 is cooled and liquefied. The liquefied refrigerant stays in the hermetic container 103 and the housing 300 is completely immersed in the liquid in some cases. At this time, a tip end of the cylindrical structure 311 in which the conductive terminal-insertion hole 308 is formed is close to the hermetic terminal 207, liquid refrigerant is interposed between the hermetic container 103 and the conductive terminal 301 and a resistance value therebetween is restrained from reducing because the resistance reversely relates to this opening area. At this time, if the inner side of the cylindrical structure 311 extends along the conductive terminal 301, reduction in the resistance value can further be suppressed. If the cylindrical structure 311 extends along the shape of an insulating member 314, it is possible to further reduce the opening area and to increase the insulation resistance value. Although a gap exists between the wire-insertion hole 307 and the wire 306, since the gap is extremely small, reduction in the resistance value between the cluster terminal 302 and the hermetic container 103 is also suppressed.

Since structures of bonded surfaces of the cluster case 303 and the cluster cover 304 are the convexo-concave shapes, reduction in the resistance value between the cluster terminal 302 and the hermetic container 103 is also suppressed. The resistance value is obtained by the following general equation, i.e., $R = \rho \times L/A$ (wherein, R is resistance value, $\rho$ is volume resistivity, L is distance and A is opening area). It can be considered that to even partially reduce the opening area is serial connection of large resistance, i.e., addition of a resistance value. Therefore, it is possible to further increase the resistance value. According to this, although the gap exists between the inside and the outside of the housing 300, it is possible to secure practical insulation performance even if the housing 300 is not completely hermetically closed.

Pressure in the hermetic container 103 is given to the housing 300 by the gap between the inside and the outside of the housing 300, the pressure in the housing 300 and the pressure in the hermetic container 103 are equalized. Therefore, it is possible to avoid a case where the housing 300 can not endure a pressure difference between the housing 300 and the hermetic container 103 and the housing 300 is damaged.

Hence, according to this embodiment, two parts, i.e., the cluster case 303 and the cluster cover 304 can suppress the reduction in the resistance value between the hermetic container 103 and the hermetic terminal 207, and reduction in the resistance value between the conductive terminal 301 and the cluster terminal 302 through liquid refrigerant, and can prevent the housing 300 from being damaged by the pressure difference between the housing 300 and the hermetic container 103.

In the present invention, pressures in the inside and the outside of the housing 300 are equalized if it is possible to secure one of the gap between the hermetic terminal 207 and a tip end of the cylindrical structure 311 in which the conductive terminal-insertion hole 308 is formed, the gap between the wire-insertion hole 307 and the wire 306, and the gap between the structures of the convexo-concave shapes of the bonded surfaces of the cluster case 303 and the cluster cover 304. Therefore, the present invention is not limited to the configuration that all of the three gaps are provided.

The shapes of the bonded surfaces of the cluster case 303 and the cluster cover 304 are not limited to those of this embodiment only if it is possible to reduce the opening area and to extend the creepage distance between the inside and the outside of the housing 300.

An outer shape of the insulating member 314 of the conductive terminal 301 and the structure of the inner diameter of the cylindrical structure 311 are not limited to the shapes of this embodiment only if it is possible to reduce the opening area.

The shape of a close portion between the tip end of the cylindrical structure 311 and the hermetic terminal 207 is not limited to that of this embodiment only if the cylindrical structure 311 and the hermetic terminal 207 are in intimate contact with each other, and the groove is formed in the tip end of the cylindrical structure 311, i.e., the inside and the outside of the housing 300 are in communication with each other. The shape of the wire-insertion hole 307 is not limited to that of this embodiment only if the length of the wire-insertion hole 307 can be extended. The configuration of the electric compressor is one example and the present invention is not limited to this configuration.

(Second Embodiment)

Figure 4:
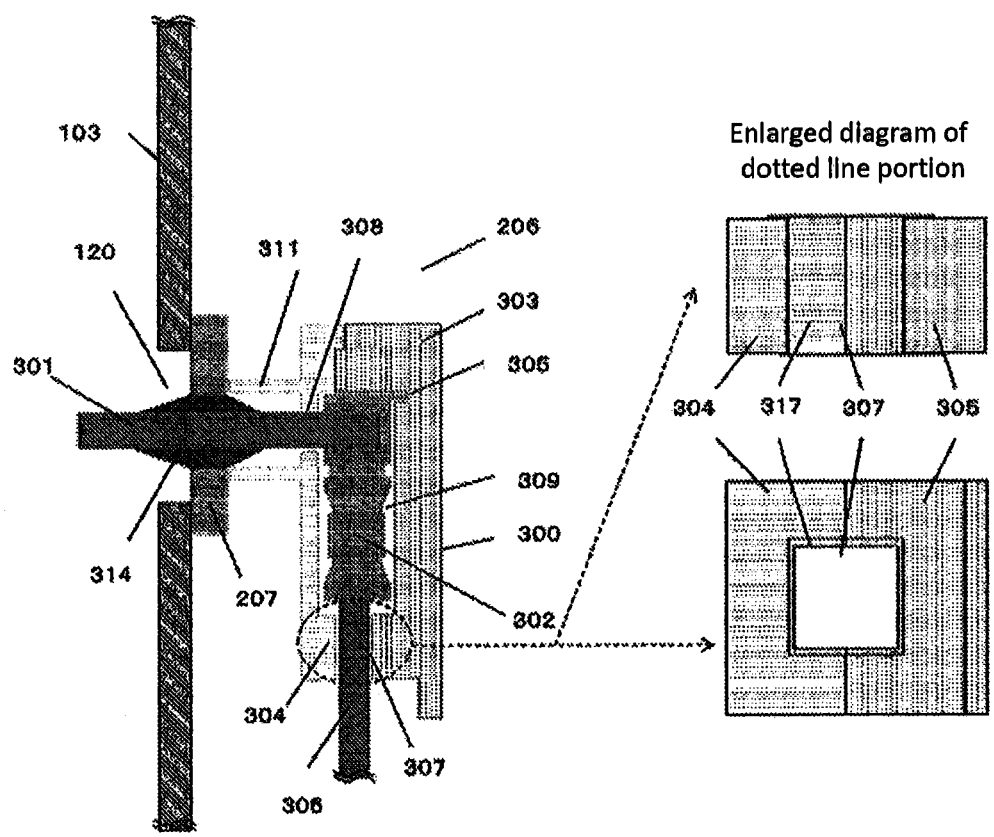
FIG. 4 is a diagram showing an essential portion of a cluster block in a second embodiment of the invention.

One example of a second embodiment will be described using FIG. 4. FIG. 4 is a partial enlarged sectional view of peripheries of the cluster block 206 and the hermetic terminal 207 of the second embodiment.

The wire-insertion hole 307 is a quadrangular prism hole configured by fitting the cluster case 303 and the cluster cover 304 to each other. An inner side of the wire-insertion hole 307 is provided with one or more convex structures 317 in a semi-circular form. A cross-sectional area of an opening of the convex structure 317 is equal to or greater than a cross-sectional area of an outer diameter of the insulating tube which is skin of the wire 306, and a length of one side of the convex structure 317 is equal to or smaller than a diameter of the insulating tube of the wire 306. The wire 306 comes into contact with the vertex of the convex structure 317 or is fastened by the vertex without undue force in the wire-insertion hole 307.

A length of the wire-insertion hole 307 in the axial direction can be increased by the convex structure 317, and a distance between the inside and the outside of the housing 300 in the wire-insertion hole 307, i.e., a distance of a portion thereof having a small opening area is increased.

Since the wire 306 passes through the wire-insertion hole 307 having an area which is equal to or greater than the cross-sectional area of the wire 306, the insulating tube does not easily bite at the time of assembling, and even when bending stress is applied to the wire 306, the surface of the wire-insertion hole 307 can receive the bending stress in a dispersed manner.

According to the structure of the wire-insertion hole 307, when the wire 306 is inserted, the insulating tube deforms, the wire-insertion hole 307 and the wire 306 come into intimate contact with each other except the quadrangular prism shape. Therefore, a gap between the wire-insertion hole 307 and the wire 306, i.e., the opening area can be reduced.

According to this embodiment, although the resistance value between the inside and the outside of the housing 300 is reduced, since it is unnecessary to provide the fine half circular convex structure 317, it becomes easy to produce the part. According to this, although the gap between the inside and the outside of the housing 300 exists, it is possible to secure practical insulation performance even if the housing 300 is not completely hermetically closed. Since other configurations are the same as those of the first embodiment, description thereof will be omitted.

(Third Embodiment)

Figure 5:
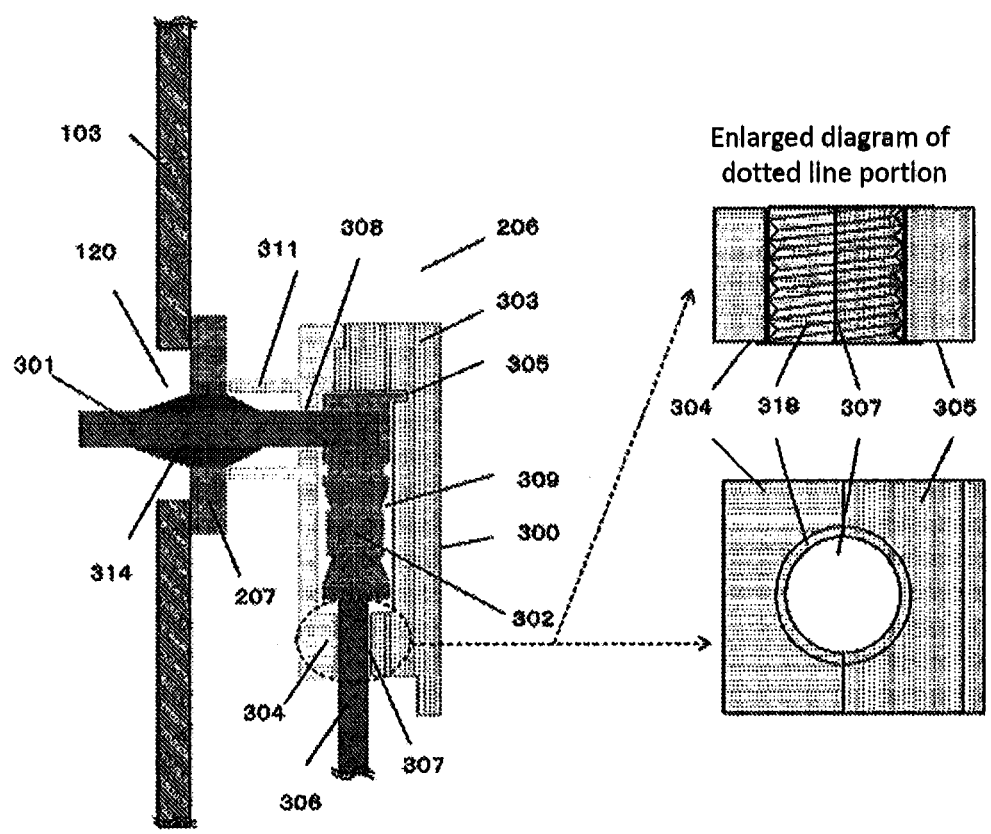
FIG. 5 is a diagram showing an essential portion of a cluster block in a third embodiment of the invention.

One example of a third embodiment will be described using FIG. 5. FIG. 5 is a partial enlarged sectional view of peripheries of the cluster block 206 and the hermetic terminal 207 of the third embodiment.

The wire-insertion hole 307 is a hole provided at its surface with a female thread-shaped convex structure 318 which is configured by fitting the cluster case 303 and the cluster cover 304 to each other. A cross-sectional area of a circle formed by a curved line of a screw thread of the wire-insertion hole 307 is equal to or smaller than a cross-sectional area of the wire 306. The wire 306 comes into contact with the wire-insertion hole 307 or is fastened by the wire-insertion hole 307 without undue force. According to this, when the wire 306 is inserted into the wire-insertion hole 307, a gap between the wire-insertion hole 307 and the wire 306, i.e., an opening area has an area of a grove of the screw thread and becomes small.

A length of the wire-insertion hole 307 can be increased, and a distance between the inside and the outside of the housing 300 of the wire-insertion hole 307, i.e., a distance of a portion thereof having a small opening area becomes long. According to this, although the gap between the inside and the outside of the housing 300 exists, it is possible to secure practical insulation performance even if the housing 300 is not completely hermetically closed.

When bending stress is applied to the wire 306 also, a surface of the wire-insertion hole 307 can receive the bending stress in a dispersed manner.

According to this embodiment, even when the wire-insertion hole 307 and the wire 306 completely come into intimate contact with each other, the inside and the outside of the housing 300 are brought into communication with each other through the grooves of the screw thread, pressure in the housing 300 and pressure in the hermetic container 103 are equalized. Therefore, it is possible to avoid a case where the housing 300 can not endure a pressure difference between the housing 300 and the hermetic container 103 and the housing 300 is damaged. Since other configurations are the same as those of the first embodiment, description thereof will be omitted.

(Fourth Embodiment)

Figure 6:
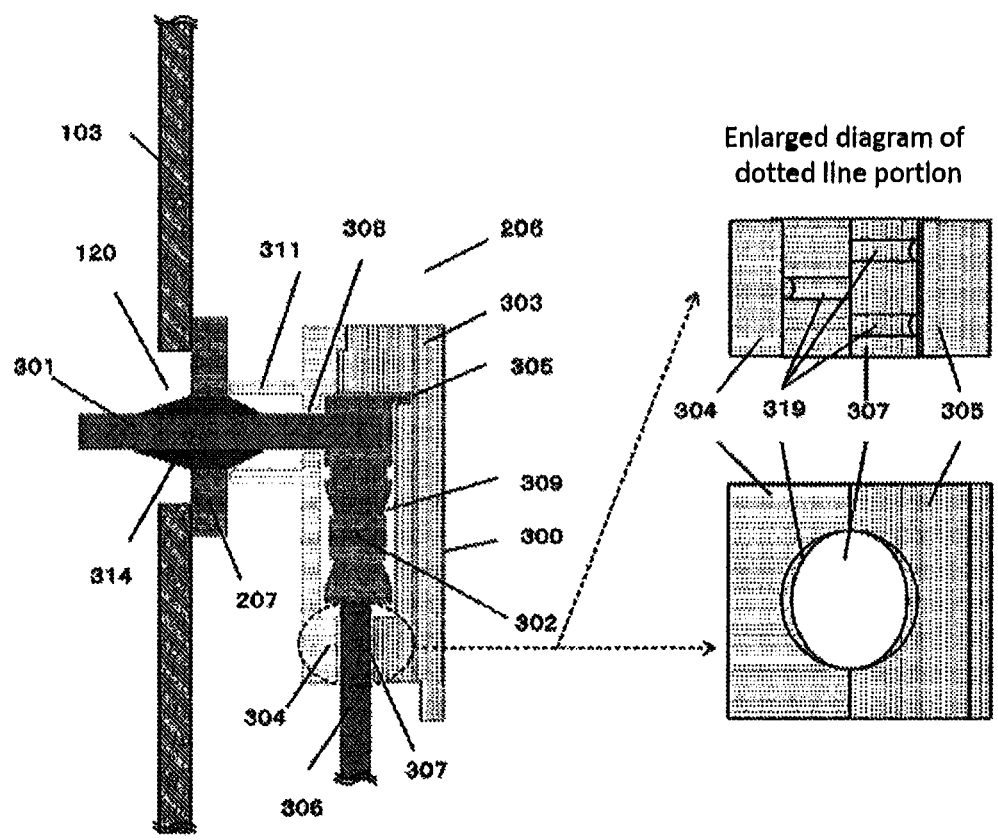
FIG. 6 is a diagram showing an essential portion of a cluster block in a fourth embodiment of the invention.

One example of a fourth embodiment will be described using FIG. 6. FIG. 6 is a partial enlarged sectional view of peripheries of the cluster block 206 and the hermetic terminal 207 of the fourth embodiment.

The wire-insertion hole 307 is a hole which is configured by fitting the cluster case 303 and the cluster cover 304 to each other. An opening area formed by a curved line of a vertex thereof and a wall surface of the wire-insertion hole 307 is equal to or smaller than a cross-sectional area of the wire 306. An inner side of the wire-insertion hole 307 is provided with convex structures 319 in a semi-circular form. More specifically, the convex structures 319 are alternately placed on the cluster case 303 and the cluster cover 304 in an insertion direction of the wire 306. The wire 306 comes into contact with the vertex of the convex structures 319 or is fastened by the convex structures 319 in the wire-insertion hole 307 without undue force. According to this, a portion having no gap between the wire-insertion hole 307 and the wire 306 can be formed.

A length of the wire-insertion hole 307 can be increased, and a distance between the inside and the outside of the housing 300 of the wire-insertion hole 307, i.e., a distance of a portion thereof having a small opening area becomes long. According to this, although the gap between the inside and the outside of the housing 300 exists, it is possible to secure practical insulation performance even if the housing 300 is not completely hermetically closed.

According to this embodiment, as compared with a case where the wire 306 is sandwiched by a flat surface, the insulating tube does not easily bite at the time of assembling, and even when bending stress or tensile stress is applied to the wire 306, the entire wire-insertion hole 307 can receive the stress in a dispersed manner. Since other configurations are the same as those of the first embodiment, description thereof will be omitted.

(Fifth Embodiment)

One example of a fifth embodiment will be described using FIG. 7. FIG. 7 is a sectional view of peripheries of the cluster block 206 and the hermetic terminal 207 of the fifth embodiment.

In an electric compressor shown in FIG. 7, a rubber insulating member 315 penetrates the conductive terminal 301. According to this, a gap between the insulating member 315 and an inner side of the cylindrical structure 311 can be made small, and it is possible to reduce an opening area and to suppress the reduction in an insulation resistance value. A shape of the insulating member 315 is not limited to this shape. According to this, although the gap between the inside and the outside of the housing 300 exists, it is possible to secure practical insulation performance even if the housing 300 is not completely hermetically closed. Since other configurations are the same as those of the first to fourth embodiments, description thereof will be omitted.

INDUSTRIAL APPLICABILITY

As described above, according to the present invention, it is possible to secure insulation properties, to minimize the increase in the number of parts, and to reduce the cost.

The invention claimed is:

1. An electric compressor comprising:
a hermetic container provided therein with a compression mechanism and a motor section;
an electric motor drive circuit section which is placed outside the hermetic container and which drives and controls the motor section;
a through hole formed in the hermetic container;
a hermetic terminal placed in the through hole;

a conductive terminal which is fixed to the hermetic terminal through an insulating member and which electrically connects the motor section and the electric motor drive circuit section to each other;

a connecting terminal mounted on a wire of the motor section; and a housing including a conductive terminal-insertion hole through which the conductive terminal penetrates and including a wire-insertion hole through which the wire penetrates, the housing which connects the conductive terminal and the connecting terminal to each other, wherein the housing is composed of a plurality of structure bodies, a convexo-concave shape which does not have a function to completely seal inside and outside of the housing is provided between bonding surfaces of the plurality of structure bodies, the housing is provided with a cylindrical structure into which the conductive terminal is inserted toward the hermetic terminal, and a convex structure which comes into contact with the wire is formed on an inner surface of the wire-insertion hole.

2. The electric compressor according to claim 1, wherein an interior space of the wire-insertion hole is of a quadrangular prism shape.

3. The electric compressor according to claim 1, wherein the inner surface of the wire-insertion hole is formed into a female thread shape, and the convex structure is formed on the inner surface of the wire-insertion hole.

4. The electric compressor according to claim 1, further comprising at least one more convex structure, wherein the plurality of convex structures are alternately provided.

5. The electric compressor according to claim 1, wherein the insulating member is mounted on the conductive terminal in the cylindrical structure.

* * * * *